United States Patent
MacDonald

[11] 3,979,796
[45] Sept. 14, 1976

[54] PANEL MOUNTING CLIP

[75] Inventor: Paul M. MacDonald, Scituate, Mass.

[73] Assignee: P. X. Industries, Inc., Rockland, Mass.

[22] Filed: Jan. 22, 1976

[21] Appl. No.: 651,343

[52] U.S. Cl. .............................. 24/73 PF; 24/81 B
[51] Int. Cl.² ........................................ A44B 21/00
[58] Field of Search .............. 24/73 PF, 73 D, 73 F, 24/73 B, 73 FT, 81 B, 81 BF, 259 FS

[56] References Cited
UNITED STATES PATENTS
3,120,971  2/1964  Bengtsson ............................ 292/91
3,272,461  9/1966  Larkin ............................... 248/27 A Primary Examiner—Werner H. Schroeder
Assistant Examiner—Doris L. Troutman
Attorney, Agent, or Firm—Morse, Altman, Oates & Bello

[57] ABSTRACT

A clip is provided for mounting panels such as false drawer fronts to cabinets. The clip is a one-piece device formed with a flat flange base attached to the rear face of the panel and includes a plurality of resilient prongs of different lengths extending perpendicularly from the base. Each prong includes a shoulder adapted to hook over the cabinet stile, and the shoulders, being at different distances from the base, permit one clip to be used for stile stock of various thicknesses and yet maintain tight locking engagement of the panel. The end of each clip is formed with an inclined cam leading edge by which the prong may be deflected while the panel is being installed.

5 Claims, 8 Drawing Figures

U.S. Patent  Sept. 14, 1976  3,979,796
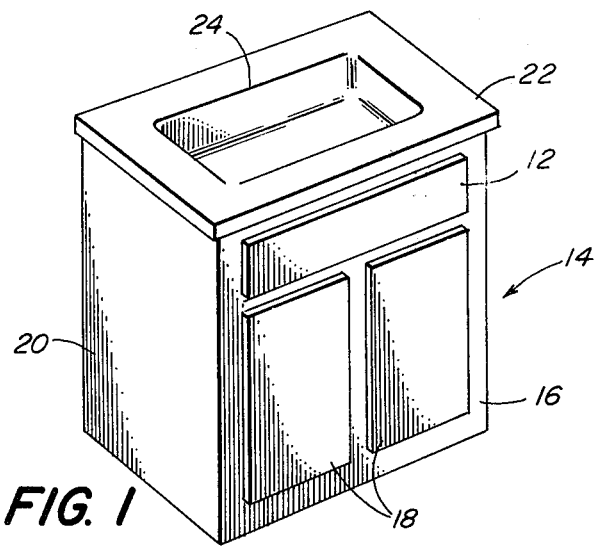
FIG. 1
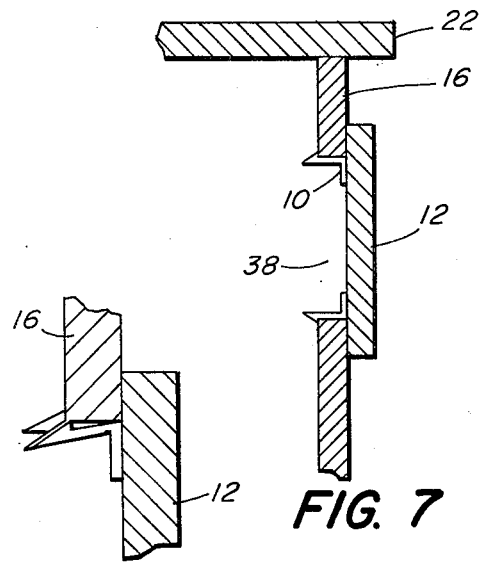
FIG. 7
FIG. 8
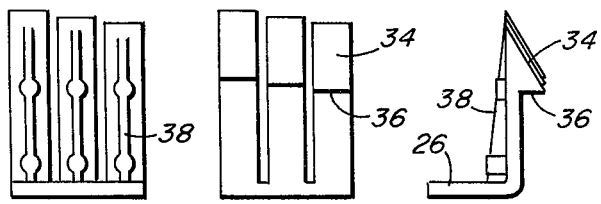
FIG. 3  FIG. 4  FIG. 5
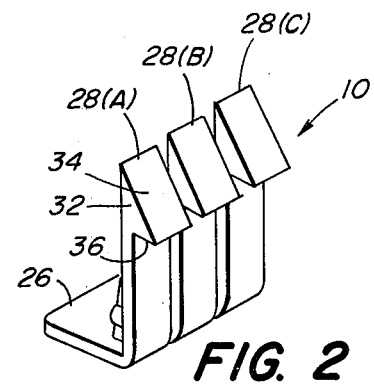
FIG. 2
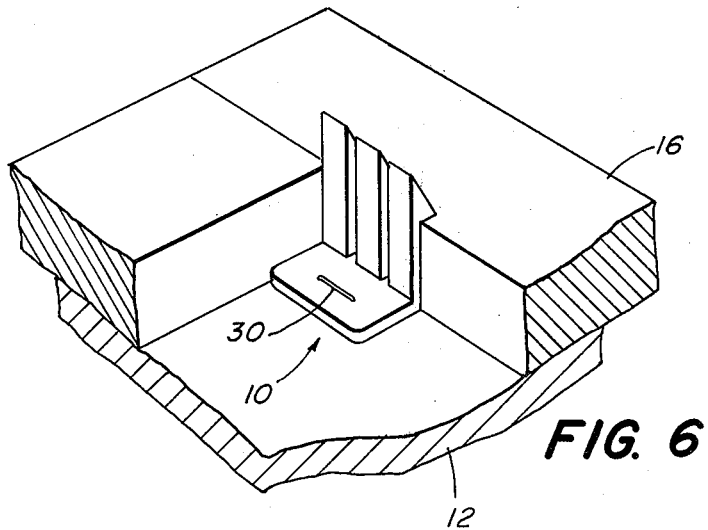
FIG. 6

PANEL MOUNTING CLIP

BACKGROUND OF THE INVENTION

1. Field of the Invention

This invention relates generally to cabinet hardware and more particularly is directed towards a new and improved clip for mounting panels such as false drawer fronts to cabinets and the like.

2. Description of the Prior Art

In the manufacture of kitchen cabinets and the like, it is common practice to install panels in various locations. For example, in a kitchen cabinet or vanity, a sink, which may be set into the counter top, takes up the room which otherwise could be occupied by a drawer. Thus, in order to standardize the cabinet frame and to provide uniformity of appearance, a false drawer front panel will be installed in an opening in the front of the cabinet where the drawer normally would be located.

One common method of installing the false front panel is by means of twistable locks disposed around the inner face of the panel, or in some instances elongated metal bars pivoted to the center of the panel are employed. These bars swing across the back of the panel, with the ends engaging the stiles or inner frame of the cabinet. Other measures have involved angle pieces fixed to the frame and to the panel by screws or staples.

While the foregoing devices have been used for many years, they have not been entirely satisfactory from the standpoint of parts costs and labor requirements, particularly for mass production purposes. The twist locks, for example, must be individually installed on the panel and then the panel must be held in position while the locks are twisted. The elongated bars have similar problems, while the angle shaped connectors require driving in screws or staples from within the cabinet by the use of a tool, and this not only is time consuming but also does not allow the panel to be removed with any degree of convenience should it become necessary to replace or repair the panel or to provide access through the opening.

Accordingly, it is an object of the present invention to provide improvements in panel mounting devices. Another object of this invention is to provide a simple, lowcost panel mounting clip which may be used in conjunction with cabinet frames or the like that may vary in thickness without adversely affecting the fit of the panel.

SUMMARY OF THE INVENTION

This invention features a panel mounting clip comprising a flat flange base adapted to be fastened to the inner face of the panel and a plurality of elongated parallel prongs formed integral with the flange and extending at right angles therefrom. The prongs are different in length and are formed with hooking shoulders at different distances from the flange, one of which shoulders is adapted to engage the inner edge of the cabinet frame. The outer edges of the prongs are inclined to provide a cam action which will cause the prongs to bend inwardly as a panel is being mounted to the frame. Once the panel is fully in place, one or more prongs will snap back into normal position to lockably engage the frame. A tight fit will result, irrespective of the thickness of the frame, by virtue of the different distances between the shoulders and the flange of the clip.

BRIEF DESCRIPTION OF THE DRAWINGS

FIG. 1 is a view in perspective of a typical kitchen cabinet or vanity which may advantageously use the invention, FIG. 2 is a veiw in perspective of a panel mounting clip made according to the invention, FIG. 3 is a view in rear elevation thereof, FIG. 4 is a view in front elevation thereof, FIG. 5 is a view in side elevation thereof, FIG. 6 is a view in perspective showing an installed clip, FIG. 7 is a detailed sectional view showing a false drawer front mounted to a cabinet and employing clips made according to the invention, and, FIG. 8 is a detailed sectional view illustrating the operation of the device.

DETAILED DESCRIPTION OF THE PREFERRED EMBODIMENT

Referring now to the drawings, the reference character 10 generally indicates a panel mounting clip which may be used, for example, to install a false drawer front panel 12 to a kitchen cabinet or vanity 14. Typically, a vanity 14 includes a front frame 16 having one or more doors 18, sides, 20, and a countertop 22. Where the vanity is provided with a sink 24 set into the countertop, the false drawer front 12 is installed in lieu of a full drawer which would normally be used. In practice, the frame 16 is fabricated from plywood, chip board or the like, having a thickness of ¾ inch. However, in actual practice the thickness of the frame may vary by fractions of an inch from one run to another. The variation of the thickness is a matter normally not under the control of the cabinet manufacturer and may be due to a variety of factors. In any event, the frame thickness is subject to variation. The clip 10 is adapted to compensate for thickness variations in the frame and allows the panel 12 to be mounted by merely first installing a number of clips in proper position to the inner face of the panel 12 and then pressing the panel over the frame opening, allowing the clips to lock the panel in place.

The clip 10 is a one-piece device of somewhat stiff yet resilient material, and for this purpose an injection molded plastic of polyethylene or the like may be used to advantage. The clip 10 includes a flat flange base 26 and a plurality of upright prongs 28 (A), (B) and (C). While the device is illustrated with three prongs, obviously this number may be increased or decreased as desired. However, for purposes involving vanity panels such as illustrated, three prongs have proven to be satisfactory. The prongs extend perpendicularly from the flange 26 along one edge thereof so that the flange 26 may be fastened to the inner face of the panel 12 as by means of a staple 30 driven through the flange into the panel. The prongs, as best shown in FIGS. 3 and 4, are in spaced parallel relation to one another and each is free to deflect or bend to a limited extent independently of one another. Each prong is provided with a head 32, the outer end of which is inclined at 34 in the form of a wedge or cam. The lower end of each wedge portion terminates in a shoulder 36 parallel to the flange 26 and perpendicular to the length of the prong. The outer face of each prong below the shoulder is smooth and flat, while the inner face may be molded with reinforcing webs 38.

Each prong is of a different length, although of similar configuration. As best shown in FIGS. 3, 4 and 5, not only is the overall length of each prong different, but the locations of the shoulders 36 also differ so that the distance between each shoulder 36 and the flange base 26 differs from one to another. The spatial distance between the shoulders and the flange is relatively small and typically may be on the order of perhaps 1/16 inch or so. The difference in the lengths and locations of the shoulders from one prong to another is to compensate for differences in the thickness of the frame 16. If only one prong was employed, the clip would not function properly if the thickness of the frame did not match precisely with the location of the shoulder. However, using multiple prongs, each with a shoulder located at a different distance from the flange, the clip will function as long as the thickness of the flange is within the range of distances provided by the different shoulders. For example, if the frame 16 is thicker than normal, the prong 28 (C), which is the longest, will be operational and its shoulder will clear the back edge of the panel 16, as suggested in FIG. 8. The other prongs will remain bent out of position, since they are too short to pass over the edge of the frame. Should the frame be of standard thickness, the center prong 28 (B) will function and, similarly, if the frame is thinner than standard, then the shortest prong 28 (A) will be functional while the other prongs 28 (B) and (C) will merely snap back into position but out of locking engagement.

In practice, the panel 12 may be provided with perhaps four or more prongs pre-mounted by the staples to the inner face of the panel in predetermined position such that the prong shoulders will engage the back edge of the frame when the panel is mounted to the cabinet, as suggested in FIG. 7. Once the prongs have been mounted to the panel, the panel is placed in front of the frame opening 38 with the inclined faces of the wedge-shaped heads 32 engaging the outer corners of the opening. The panel is then pressed inwardly, causing all of the prongs to bend inwardly until the panel is all of the way in against the front of the frame. Once in this position, one or more prongs will snap back into locking position engaging the back edge of the frame and holding the panel firmly in position without any looseness or play even though the frame thickness may be beyond normal specifications. The panel may be readily removed for any reason by merely reaching in behind the frame and pressing the fingers inwardly to release them from the frame. No additional tools are required, nor is there any need to adjust or perform any operations on the cabinet once it is installed.

While the clip has been shown in conjunction with false drawer fronts, it may be utilized in other applications where dimensional standards vary.

Having thus described the invention, what I claim and desire to obtain by Letters Patent of the United States is:

1. A clip for mounting a panel over an opening in a frame or the like, comprising
   a. a flat flange base adapted to be fastened to the inner face of said panel, and
   b. a plurality of resilient parallel prongs extending perpendicularly from said flange,
   c. each of said prongs being formed at its free end with a head having a smooth frame-engaging surface adapted to deflect said prong as said panel is being mounted, each head also being formed with a shoulder perpendicular to said prong and adapted to engage an inner edge of said frame,
   d. the distance between each shoulder and said flange being different for each prong.

2. A clip, according to claim 1, wherein said prongs extend from one edge of said base.

3. A clip, according to claim 1, wherein said prongs are spaced from one another.

4. A clip, according to claim 1, wherein said clip is of molded plastic one-piece construction.

5. A clip, according to claim 2, wherein said shoulders extend outwardly from said one edge and said surface extends from the outer edge of said shoulder to the tip of said prong.

* * * * *